US008218486B2

(12) United States Patent
Jung et al.

(10) Patent No.: US 8,218,486 B2
(45) Date of Patent: Jul. 10, 2012

(54) APPARATUS AND METHOD FOR TRANSMITTING/RECEIVING PACKET IN A MOBILE COMMUNICATION SYSTEM

(75) Inventors: Jung-Soo Jung, Seoul (KR); Beom-Sik Bae, Suwon-si (KR); Dae-Gyun Kim, Seongnam-si (KR); Yu-Chul Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1207 days.

(21) Appl. No.: 11/227,326

(22) Filed: Sep. 16, 2005

(65) Prior Publication Data

US 2006/0062164 A1 Mar. 23, 2006

(30) Foreign Application Priority Data

Sep. 18, 2004 (KR) .................. 10-2004-0074881
Jan. 10, 2005 (KR) .................. 10-2005-0002333
Jan. 11, 2005 (KR) .................. 10-2005-0002519
Apr. 22, 2005 (KR) .................. 10-2005-0033786

(51) Int. Cl.
*H04W 4/00* (2009.01)
*H04B 7/005* (2006.01)
*H04W 72/00* (2009.01)

(52) U.S. Cl. ......... 370/329; 370/278; 370/330; 455/451
(58) Field of Classification Search .................. 370/329; 455/452.2
See application file for complete search history.

(56) References Cited

U.S. PATENT DOCUMENTS

| | | | |
|---|---|---|---|
| 6,381,220 B1 | 4/2002 | Kung et al. | |
| 6,901,254 B2 * | 5/2005 | Ahn | 455/422.1 |
| 7,239,847 B2 * | 7/2007 | Attar et al. | 455/63.1 |
| 2001/0038630 A1 | 11/2001 | Tong et al. | |
| 2002/0022487 A1 | 2/2002 | Ahn | |
| 2002/0142780 A1 * | 10/2002 | Airy et al. | 455/452 |
| 2004/0160984 A1 | 8/2004 | Sidhushayana | |
| 2006/0146721 A1 * | 7/2006 | Attar et al. | 370/238 |

FOREIGN PATENT DOCUMENTS

| | | |
|---|---|---|
| EP | 1 460 791 A2 | 9/2004 |
| RU | 95121152 A1 | 12/1997 |
| RU | 2149518 C1 | 5/2000 |
| WO | WO 99/23844 A2 | 5/1999 |
| WO | WO 2004 032369 A2 | 4/2004 |

OTHER PUBLICATIONS

Parry, Richard, "cdma2000 1xEV-DO: a 3G wireless Internet access system," IEEE Potentials, Jan. 21, 2009, 2002, pp. 10-13.
Bi, Qi et al., "Performance of 1xEV-Do Third-Generation Wireless High-Speed Data Systems," Bell Labs Technical Journal, 2003, No. 7(3), pp. 97-107.

* cited by examiner

*Primary Examiner* — Patrick Edouard
*Assistant Examiner* — Huy C Ho
(74) *Attorney, Agent, or Firm* — Roylance, Abrams, Berdo & Goodman, LLP

(57) ABSTRACT

A method and apparatus are provided for receiving, by an access network (AN), reception strength of a forward pilot channel, measured and reported by each access terminal (AT), as forward data rate information, and transmitting packet data to each AT according to the forward data rate information. When the number of repeated transmission slots for packet data transmitted based on the forward data rate information is greater than or equal to two, the AN repeatedly transmits the packet data as many times as the number of slots, which is less than the number of repeated transmission slots, and transmits new packet data through the remaining slots.

32 Claims, 6 Drawing Sheets

APPARATUS AND METHOD FOR TRANSMITTING/RECEIVING PACKET IN A MOBILE COMMUNICATION SYSTEM

PRIORITY

This application claims the benefit under 35 U.S.C. §119(a) of Korean Patent Applications entitled "Apparatus and Method for Transmitting/Receiving Packet in a Mobile Communication System" filed in the Korean Intellectual Property Office on Sep. 18, 2004 and assigned Serial No. 2004-74881, entitled "Apparatus and Method for Transmitting/Receiving Packet in a Mobile Communication System" filed in the Korean Intellectual Property Office on Jan. 10, 2005 and assigned Serial No. 2005-2333, entitled "Apparatus and Method for Transmitting/Receiving Packet in a Mobile Communication System" filed in the Korean Intellectual Property Office on Jan. 11, 2005 and assigned Serial No. 2005-2519, and entitled "Apparatus and Method for Transmitting/Receiving Packet in a Mobile Communication System" filed in the Korean Intellectual Property Office on Apr. 22, 2005 and assigned Serial No. 2005-33786, the entire contents of all of which are hereby incorporated by reference.

BACKGROUND OF THE INVENTION

1. Field of the Invention

The present invention relates generally to an apparatus and method for transmitting/receiving data in a mobile communication system. In particular, the present invention relates to an apparatus and method for transmitting/receiving packet data in a mobile communication system.

2. Description of the Related Art

A mobile communication system has been developed to provide a voice service, guaranteeing the mobility of a user. With the rapid progress in communication technology, a mobile communication system has evolved into a system capable of providing a data service as well. Recently, many researches are being conducted on high-speed data transmission in a Code Division Multiple Access (CDMA) mobile communication system. A 1× Evolution Data Only (1×EVDO) system is the typical mobile communication system having a channel structure for the high-speed data transmission. The 1×EVDO system was proposed in $3^{rd}$ Generation Partnership Project 2 (3GPP2) to complement data communication of the IS-2000 system.

In the 1×EVDO system, data communication can be divided into forward data communication and reverse data communication. The term "forward data communication" refers to data communication from an access network (or base station) to an access terminal (or mobile station), while the term "reverse data communication" refers to data communication from an access terminal to an access network. A description will now be made of structures of forward channels in the 1×EVDO system. The forward channels are classified into a pilot channel, a forward Medium Access Control (MAC) channel, a forward traffic channel, and a forward control channel, all of which are transmitted to an access terminal on a Time Division Multiplexing (TDM) basis. A set of the TDM transmission signals is called a "burst."

Among these channels, the forward traffic channel transmits a user data packet, and the forward control channel transmits a control message and a user data packet. In addition, the forward MAC channel is used for reverse rate control, transmission of power control information, and assignment of forward data channel.

A description will now be made of reverse channels used in the 1×EVDO system. Unlike the forward channels, the reverse channels used in the 1×EVDO system comprise different identification codes unique to access terminals. Therefore, in the following description, the "reverse channels" refer to channels transmitted to an access network with different identification codes unique to the access terminals. The reverse channels comprise a pilot channel, a reverse traffic channel, an access channel, a Data Rate Control (DRC) channel, and a Reverse Rate Indicator (RRI) channel.

Functions of the reverse channels will be described in greater detail. The reverse traffic channel, like the forward traffic channel, transmits a user data packet in the reverse direction. The DRC channel is used to indicate a forward data rate that the access terminal can support, and the RRI channel is used to indicate a rate of a data channel transmitted in the reverse direction. The access channel is used when the access terminal transmits a message or traffic to the access network before the traffic channel is connected. With reference to FIG. 1, a description will now be made of a configuration of the 1×EVDO system, a rate control operation, and its associated channels.

FIG. 1 is a conceptual diagram illustrating a 1×EVDO mobile communication system.

Referring to FIG. 1, reference numeral 100 denotes access terminals (ATs), reference numeral 110 denotes access network transceiver systems (ANTSs), and reference numeral 120 denotes access network controllers (ANCs). A brief description of the system configuration will now be made. A first ANTS 110a communicates with a plurality of ATs 100a and 100b, and a second ANTS 110b communicates with an AT 100c. The first ANTS 110a is connected to a first ANC 120a, and the second ANTS 110b is connected to a second ANC 120b. Each of the ANCs 120a and 120b can be connected to two or more ANTSs. In FIG. 1, one ANC is connected to only one ANTS, as an example. The ANCs 120a and 120b are connected to a packet data service node (PDSN) 130 that provides a packet data service, and the PDSN 130 is connected to an Internet network 140.

In the mobile communication system, each of the ANTSs 110a and 110b transmits packet data only to the AT having a high packet data rate among the ATs located in its coverage. A detailed description thereof will now be made. In the following description, an AT will be denoted by reference numeral 100, and an ANTS will be denoted by reference numeral 110.

For rate control of a forward channel, an AT 100 measures reception strength of a pilot channel transmitted by an ANTS 110, and determines a forward data rate desired by the AT 100 according to a fixed value predetermined based on the measured pilot reception strength. Thereafter, the AT 100 transmits DRC information corresponding to the determined forward data rate to the ANTS 110 over a DRC channel. Then the ANTS 110 receives DRC information from all of the ATs intending to communicate therewith, located in its coverage. Based on the DRC information, the ANTS 110 can transmit packet data only to a particular AT having a good channel quality condition at a data rate reported by the AT. The DRC information refers to a value determined from a possible forward data rate calculated by the AT by measuring its channel condition. Although a mapping relationship between the forward channel condition and the DRC information is subject to change according to implementation, generally, the mapping relationship is fixed in the manufacturing process of the AT.

The mapping relationship between the DRC value reported by an AT and its associated data rate and transmission time are shown in Table 1 below.

TABLE 1

| DRC | Data Rate (kbps) | Number of TX (slots) | Transmission Format |
|---|---|---|---|
| 0x0 | 0 | 16 | (1024, 16, 1024) |
| 0x1 | 38.4 | 16 | (1024, 16, 1024) |
| 0x2 | 76.8 | 8 | (1024, 8, 512) |
| 0x3 | 153.6 | 4 | (1024, 4, 256) |
| 0x4 | 307.2 | 2 | (1024, 2, 128) |
| 0x5 | 307.2 | 4 | (2048, 4, 128) |
| 0x6 | 614.4 | 1 | (1024, 1, 64) |
| 0x7 | 614.4 | 2 | (2048, 2, 64) |
| 0x8 | 921.6 | 2 | (3072, 2, 64) |
| 0x9 | 1228.8 | 1 | (2048, 1, 64) |
| 0xa | 1228.8 | 2 | (4096, 2, 64) |
| 0xb | 1843.2 | 1 | (3072, 1, 64) |
| 0xc | 2457.6 | 1 | (4096, 1, 64) |
| 0xd | 1536 | 2 | (5120, 2, 64) |
| 0xe | 3072 | 1 | (5120, 1, 64) |

It can be noted from Table 1 that the transmission format is expressed in the form of (A, B, C). The transmission format will be described herein below with reference to a first field of Table 1, as an example. In the transmission format (A, B, C), C=1024 indicates 1024-bit information, B=136 indicates that the information is transmitted for 16 slots, and A=1024 indicates that a 1024-chip preamble is transmitted. Therefore, an ANTS transmits data to an AT with the transmission format corresponding to a DRC value reported by the AT. After reporting the DRC value, the AT attempts to receive a forward data channel only with the transmission format corresponding to the reported DRC value. This agreement is made because no other channel exists to indicate a data rate for a data channel transmitted in the forward direction. That is, when the ANTS transmits data using a transmission format other than the transmission format reported by the AT, there is no way to indicate the transmission format, so that the AT cannot receive the data. Therefore, the ANTS transmits data only with the transmission format corresponding to (compatible with) the DRC reported by the AT. For example, for an AT that transmitted DRC=0x01 over a DRC channel, the ANTS transmits data using a transmission format (1024, 16, 1024) corresponding to the DRC value, and the AT attempts to receive the data with only the transmission format of the corresponding DRC value.

Among the various transmission formats of Table 1, particular transmission formats have a very long transmission time. For example, the transmission format corresponding to the DRC=0x01 shows transmission over 16 slots, and a high-rate packet data (HRPD) system has a 4-slot interlacing structure in which it transmits one date packet every 4 slots. The HRPD system must attempt transmission for 16×4=64 slots unless the AT succeeds in receiving data within the maximum number of transmissions, defined in the transmission format. The AT of the HRPD system does not attempt to receive a new packet, in other words, detect a new preamble, for the time. This transmission format with the long transmission time may not be disadvantageous for a general data service. However, when real-time data susceptible to time delay, such as voice and image data, is transmitted with the transmission format, even though the transmission is correctly made after passage of the 64 slots, the correctly transmitted/received packet cannot be used due to the long delay for the transmission. That is, continuous attempts to transmit/receive the real-time packets after a lapse of a predetermined time from the allowable transmission time can become meaningless due to the transmission delay.

The packet data that the ANTS transmits to one AT according to received DRC information in the method of Table 1 is called a "single user packet." The ANTS transmits data using the single user packet for the general data service. Compared with the general data service, such a data service as voice-over-Internet protocol (VoIP) requires a lower transmission bandwidth of about 9.6 kbps, in which data of about 192 bits is transmitted every 20 ms. Transmitting the short data through the single user packet having a size of a minimum of 1024 bits causes unnecessary bandwidth waste. In order to prevent the resource waste in the wireless access section, a scheme for transmitting data for several users through one physical placket has been introduced, and this packet format is called a "multiuser packet." The multiuser packet will now be described with reference to Table 2 below.

TABLE 2

| DRC | Rate (kbps) | List of Associated Multi-User Transmission Formats |
|---|---|---|
| 0x0 | 0 | (128, 4, 256), (256, 4, 256), (512, 4, 256), (1024, 4, 256) |
| 0x1 | 38.4 | (128, 4, 256), (256, 4, 256), (512, 4, 256), (1024, 4, 256) |
| 0x2 | 76.8 | (128, 4, 256), (256, 4, 256), (512, 4, 256), (1024, 4, 256) |
| 0x3 | 153.6 | (128, 4, 256), (256, 4, 256), (512, 4, 256), (1024, 4, 256) |
| 0x4 | 307.2 | (128, 4, 256), (256, 4, 256), (512, 4, 256), (1024, 4, 256) |
| 0x5 | 307.2 | (128, 4, 256), (256, 4, 256), (512, 4, 256), (1024, 4, 256), (2048, 4, 128) |
| 0x6 | 614.4 | (128, 4, 256), (256, 4, 256), (512, 4, 256), (1024, 4, 256) |
| 0x7 | 614.4 | (128, 4, 256), (256, 4, 256), (512, 4, 256), (1024, 4, 256), (2048, 4, 128) |
| 0x8 | 921.6 | (128, 4, 256), (256, 4, 256), (512, 4, 256), (1024, 4, 256), (2048, 4, 128), (3072, 2, 64) |
| 0x9 | 1228.8 | (128, 4, 256), (256, 4, 256), (512, 4, 256), (1024, 4, 256), (2048, 4, 128) |
| 0xa | 1228.8 | (128, 4, 256), (256, 4, 256), (512, 4, 256), (1024, 4, 256), (2048, 4, 128), (3072, 2, 64), (4096, 2, 64) |
| 0xb | 1843.2 | (128, 4, 256), (256, 4, 256), (512, 4, 256), (1024, 4, 256), (2048, 4, 128), (3072, 2, 64) |
| 0xc | 2457.6 | (128, 4, 256), (256, 4, 256), (512, 4, 256), (1024, 4, 256), (2048, 4, 128), (3072, 2, 64), (4096, 2, 64) |
| 0xd | 1536 | (128, 4, 256), (256, 4, 256), (512, 4, 256), (1024, 4, 256), (2048, 4, 128), (3072, 2, 64), (4096, 2, 64), (5120, 2, 64) |
| 0xe | 3072 | (128, 4, 256), (256, 4, 256), (512, 4, 256), (1024, 4, 256), (2048, 4, 128), (3072, 2, 64), (4096, 2, 64), (5120, 2, 64) |

Table 2 illustrates a format of the multiuser packet for each DRC in the 1×EVDO system. In Table 2, each DRC index comprises its associated data rate and a format of a packet to be transmitted to multiple users. A description thereof will be made with reference to a fifth field of Table 2, as an example. That is, a format of a multiuser packet transmitted to multiple ATs that transmitted DRC=5 is given as (128, 4, 256), (256, 4, 256), (512, 4, 256), (1024, 4, 256), (2048, 4, 128). This multiuser packet comprises packet data for several users, and is transmitted together with addresses of the ATs that will receive the packet data. An AT, upon receiving the multiuser packet, determines whether its own address is included in the received multiuser packet, and if its own address is included therein, processes a user packet corresponding thereto and transmits an acknowledgement (ACK) over a reverse ACK channel in response thereto.

In the 1×EVDO system, the ANTS cannot transmit a new packet to ATs compatible with the transmitted multiuser packet, before it has transmitted the multiuser packet up to the last slot of the transmission format or it receives an ACK from the ATs. For example, in the case where the ANTS transmitted data to an AT#1, an AT#2, and an AT#3 located in its cell with a (1024, 4, 256) multiuser packet, because the multiuser packet is compatible with DRC=1~14, all of the ATs that transmitted the DRC=1~14 attempt to receive the multiuser packet. However, the other ATs except for the AT#1, AT#2 and AT#3 do not transmit ACK because their own addresses are not included in the multiuser packet. In some cases, therefore, the ANTS cannot transmit data to the other ATs except for the AT#1, AT#2 and AT#3 due to the foregoing restrictions, even though the AT#1, the AT#2 and the AT#3 have correctly received the multiuser packet before the last slot, in other words, $4^{th}$ slot, of the transmission format. Therefore, when the AT#1, AT#2, and AT#3 have correctly received the multiuser packet and transmitted ACKs at $1^{st}$, $2^{nd}$ and $3^{rd}$ slots among 4 slots, respectively, the ANTS must schedule a new packet at a $4^{th}$ slot. However, the ANTS cannot schedule packets to the other ATs except for the AT#1, AT#2, and AT#3 from which it has received ACKs, because it has transmitted the multiuser packet to the ATs compatible with the transmitted multiuser packet, up to the last slot of the transmission format, or it has failed to transmit a new packet before it receives the ACKs from the ATs.

SUMMARY OF THE INVENTION

An object of the present invention is to provide an apparatus and method capable of starting transmission of a new data packet even though the transmission has failed within the maximum number of transmissions defined in a transmission format corresponding to a Data Rate Control (DRC) index indicated by an access terminal (AT).

Another object of the present invention is to provide an apparatus and method for resolving scheduling restrictions of an access network transceiver system (ANTS).

Further another object of the present invention is to provide an apparatus and method capable of increasing throughput by efficiently performing ANTS scheduling.

Yet another object of the present invention is to provide an apparatus and method capable of starting transmission of a new data packet within the maximum number of transmissions in transmission of a multiuser packet.

According to one aspect of an exemplary embodiment of the present invention, a method is provided for receiving, by an access network (AN), reception strength of a forward pilot channel, measured and reported by each access terminal (AT), as forward data rate information, and transmitting packet data to each AT according to the forward data rate information. When the number of repeated transmission slots for packet data transmitted based on the forward data rate information is greater than or equal to two, the AN repeatedly transmits the packet data as many times as the number of slots, which is less than the number of repeated transmission slots, and transmits new packet data through the remaining slots.

According to another aspect of an exemplary embodiment of the present invention, a method is provided for measuring, by an access terminal (AT), reception strength of a forward pilot channel, reporting the measured reception sensitivity as forward data rate information, and receiving packet data based on the reported forward data rate information. When the received packet data is repeatedly transmitted thereto, the AT determines whether new packet data is received within the number of repeated transmissions based on the forward data rate information, and if the new packet data is received, processes the received new packet data.

According to another aspect of an exemplary embodiment of the present invention, a method is provided for performing partial transmission in a mobile communication system in which each access terminal (AT) measures reception strength of a pilot channel transmitted from an access network (AN), and the AN receives a report on the measured reception strength from each AT and transmits packet data to the AT according to predetermined forward data rate information. The method comprises the steps of repeatedly transmitting, by the AN, the packet data as many times as the number of slots, which is less than the number of repeated transmission slots and transmitting new packet data, if the number of repeated transmission slots for the packet data transmitted based on the forward data rate information is greater than or equal to two; and receiving, by the AT, packet data as many times as the number being less than the number of repeated transmissions for the packet data based on the forward data rate information, determining whether new packet data is received, and if the new packet data is received, processing the received new packet data.

According to yet another aspect of an exemplary embodiment of the present invention, an access network (AN) apparatus is provided for receiving reception strength of a forward pilot channel, measured and reported by each access terminal (AT), as forward data rate information, and transmitting packet data to each AT according to the forward data rate information. The AN apparatus comprises a data queue for storing data to be transmitted to each AT, a data generation and transmission/reception unit for generating packet data using data received from the data queue according to a transmission format and transmitting the packet data, and an AN controller for scheduling a transmission time of data stored in the data queue based on the forward data rate information, controlling the transmission based on the forward data rate information at the scheduled time, and when the number of repeated transmission slots for packet data is greater than or equal to two, repeatedly transmitting the packet data as many times as the number of slots, which is less than the number of repeated transmission slots, and transmitting new packet data.

According to still another aspect of an exemplary embodiment of the present invention, an access terminal (AT) apparatus is provided for measuring reception strength of a forward pilot channel, reporting the measured reception sensitivity as forward data rate information, and receiving packet data based on the reported forward data rate information. The AT apparatus comprises a radio frequency (RF) unit for frequency-down-converting a received forward packet data, a demodulator for demodulating an output of the RF unit, a decoder for decoding a signal demodulated by the demodulator, and an AT controller for receiving new packet data within the number of repeated transmissions based on the forward data rate information, when the received packet data is repeatedly transmitted thereto.

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

Figure 1:
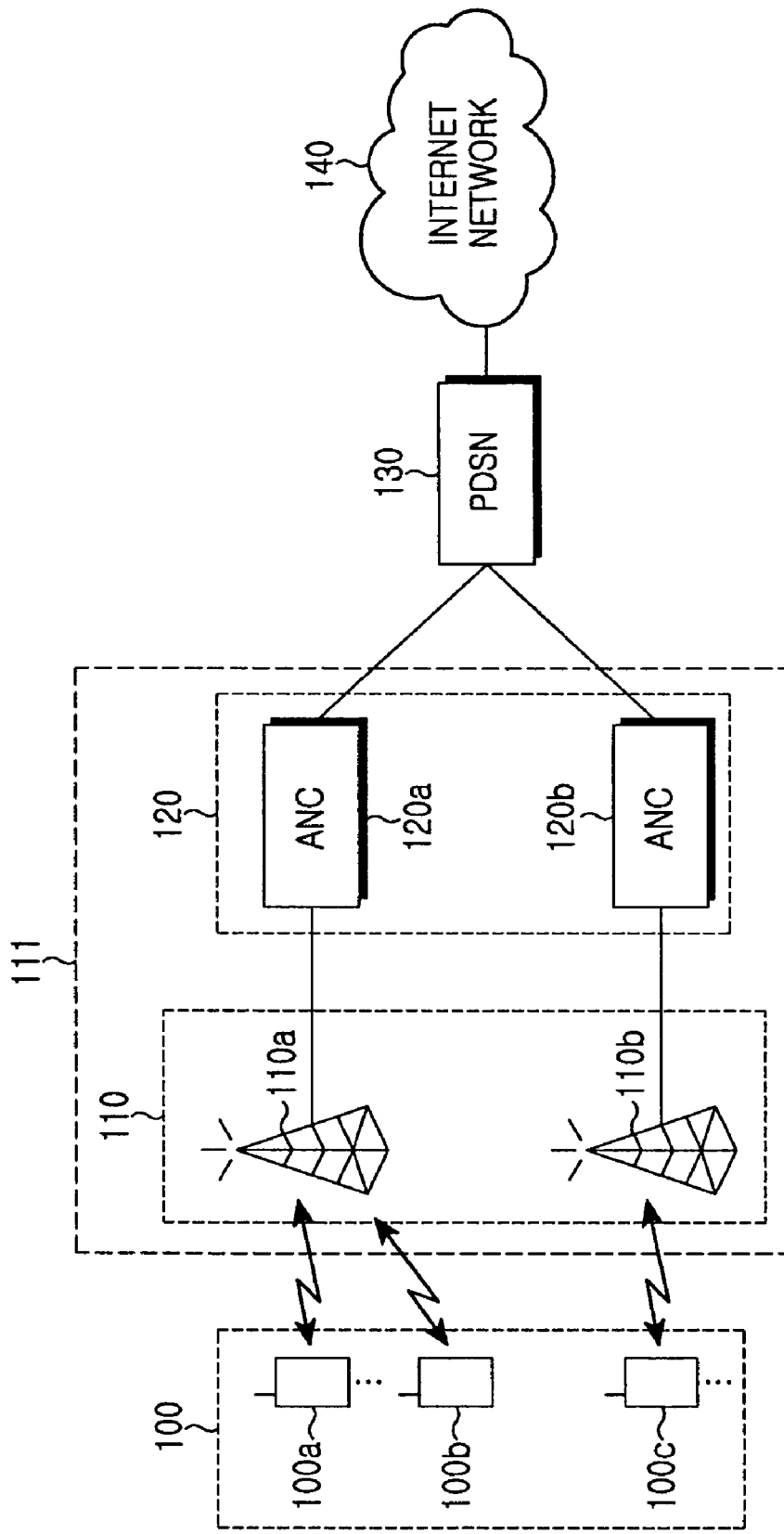
FIG. 1 is a conceptual diagram illustrating a 1× Evolution Data Only (1×EVDO) mobile communication system.

Exemplary embodiments of the present invention will now be described in greater detail with reference to the accompanying drawings. In the following description, a detailed description of known functions and configurations incorporated herein will be omitted for clarity and conciseness.

In the following description, an exemplary embodiment of the present invention provides a method in which an access terminal (AT) attempts to receive a new packet, in other words, to detect a preamble, in the course of receiving data regardless of a transmitted Data Rate Control (DRC) value, thereby solving the problems of a conventional 1×EVDO system. In addition, an exemplary embodiment of the present invention provides a method in which an AT attempts to receive a new packet, in other words, to detect a preamble, in the course of receiving a multiuser packet, thereby solving the problems of a conventional 1×EVDO system.

An exemplary embodiment of the present invention defines "partial transmission information" to provide a method in which an AT determines whether to continuously attempt to detect a preamble in the course of receiving a packet in order to assist in scheduling of an access network (AN). The partial transmission information can be exchanged between an AT and an AN using a configuration attribute or message of the 1×EVDO system.

A description of exemplary embodiments of the present invention comprises three parts. First, a description will be made of definition, exchange, and setting of the partial transmission information. Second, a description will be made of an operation of an AT when the partial transmission information is used. Finally, a description will be made of an operation of an AN when the partial transmission information is used.

1. Exchange and Setting of Partial Transmission Information Using Configuration Attribute This section proposes a method of exchanging and setting the partial transmission information using a configuration attribute of the 1×EVDO system. When a session is established, parameter setting values for each of the protocols to be used in the 1×EVDO system are determined. When the session is opened with one of the setting values, the partial transmission information according to an exemplary embodiment of the present invention can be used as a configuration attribute of a Medium Access Control (MAC) protocol, for example, a forward traffic channel MAC protocol. In this case, if the session setup value is changed, resetting session parameters, the partial transmission information to be used by an AN cannot be set for each AT. Such protocol setting values can be different for the respective ANs, and when the values change, new values must be set through a new negotiation.

A format of a PartialSpanEnabled configuration attribute, which comprises a partial transmission information configuration attribute, according to an exemplary embodiment of the present invention is shown in Table 3.

TABLE 3

| Attribute ID | Attribute | values | Meaning |
|---|---|---|---|
| 0xf9 | PartialSpanEnabled | 0x00 | Use of Partial Span is disabled |
| | | 0x01 | Use of Partial Span is enabled |

In Table 3, the partial transmission information configuration attribute has a value of 0x00 as a default value, and this value indicates possibility of partial transmission. When a value of the partial transmission information configuration attribute is agreed as 0x01 between an AT and an AN, the AN can perform partial transmission for a Data Rate Control (DRC) reported by the AT and its associated transmission format. The added configuration attribute is defined as public data of the corresponding protocol, and can be used for determining whether the partial transmission is possible in a physical layer that actually transmits a packet according to a DRC value.

A format of a MinSpan configuration attribute, which comprises another partial transmission information configuration attribute, according to an exemplary embodiment of the present invention is shown in Table 4.

TABLE 4

| Field |
|---|
| Length |
| AttributeID |
| One or more of the following record: |
| |
| ValueID |
| MinSpanSUPDRC0 |
| MinSpanSUPDRC1 |
| MinSpanSUPDRC2 |
| MinSpanSUPDRC3 |
| MinSpanSUPDRC4 |
| MinSpanSUPDRC5 |
| MinSpanSUPDRC6 |
| MinSpanSUPDRC7 |
| MinSpanSUPDRC8 |
| MinSpanSUPDRC9 |
| MinSpanSUPDRCA |
| MinSpanSUPDRCB |
| MinSpanSUPDRCC |
| MinSpanSUPDRCD |
| MinSpanSUPDRCE |
| MinSpanMUP1024 |
| MinSpanMUP2048 |
| MinSpanMUP3072 |
| MinSpanMUP4096 |
| MinSpanMUP5120 |

The MinSpan configuration attribute comprises a Length field, an AttributeID field, a ValueID field, a MinSpanSUPDRC0~MinSpanSUPDRCE field, and a MinSpanMUP1024~MinSpanMUP5120field. The Length field indicates a length of the configuration attribute, the AttributeID field comprises a identification (ID) field for distinguishing the configuration attribute from another configuration attribute, the ValueID field is an ID field for distinguishing between particular values presented for MinSpanSUPDRC0~MinSpanSUPDRCE and MinSpanMUP1024~MinSpanMUP5120, and both of the MinSpanSUPDRC0~MinSpanSUPDRCE field and the MinSpanMUP1024~MinSpanMUP5120field indicate actual partial transmission information.

The MinSpanSUPDRC0~MinSpanSUPDRCE field indicates how many slots later after starting transmission of a transmission format the partial transmission is possible, when the current transmission packet is a single user packet and its transmission format corresponds to each of DRC0~DRCE. For example, if an AN is transmitting a packet to a particular AT with a single user transmission format (16-slot transmission format) corresponding to a DRC1 reported by the AT and a value of the MinSpanSUPDRC1 field is 5, the AN does not perform the partial transmission during transmission of $1^{st}$ through $5^{th}$ slots, but can perform the partial transmission beginning at a $6^{th}$ slot. The AT that is receiving the transmission format corresponding to the DRC1 is not required to make a detection attempt for a new preamble while receiving the $1^{st}$ through $5^{th}$ slots, but must detect a new preamble beginning at the $6^{th}$ slot.

That is, the AT must attempt to detect a new preamble beginning at a slot corresponding to a least value among the maximum number of retransmissions for a single user packet corresponding to a DRC reported by the AT, the maximum number (a point where the next packet can be transmitted without partial transmission) of retransmissions for the currently received single user packet, and a MinSpanSUPDRCx value (a point where the next packet can be transmitted due to occurrence of partial transmission).

Similarly, the MinSpanMUP1024-MinSpanMUP5120field indicates how many slots later after starting transmission of a transmission format the partial transmission is possible, when the current transmission packet is a multiuser packet and its transmission format corresponds to each of <1024 (or 128, 256, 512), 4, 256>, <2048, 4, 128>, <3072, 2, 64>, <4096, 2, 64>, and <5120, 2, 64>. For example, if an AN is transmitting a packet to a particular AT with a multiuser transmission format of <2048, 4, 128> and a value of a MinSpanMUP2048 field for the corresponding AT is 2, the AN does not perform the partial transmission to the AT during transmission of $1^{st}$ and $2^{nd}$ slots, but can perform the partial transmission beginning at a $3^{rd}$ slot. The AT that is receiving the transmission format is not required to make a detection attempt for a new preamble while receiving the $1^{st}$ and $2^{nd}$ slots, but must detect a new preamble beginning at the $3^{rd}$ slot.

That is, the AT must attempt to detect a new preamble beginning at a slot corresponding to a least value among the maximum number (a point where the currently received multiuser packet can be correctly received, and this condition is effective only when the multiuser packet format is longer in length than the single user packet format corresponding to the DRC of the AT) of retransmissions for a single user packet corresponding to a DRC reported by the AT, the maximum number (a point where the next packet can be transmitted without partial transmission) of retransmissions for the currently received multiuser packet, and a MinSpanSUPDRCx value (a point where the next packet can be transmitted due to occurrence of partial transmission).

Figure 2:
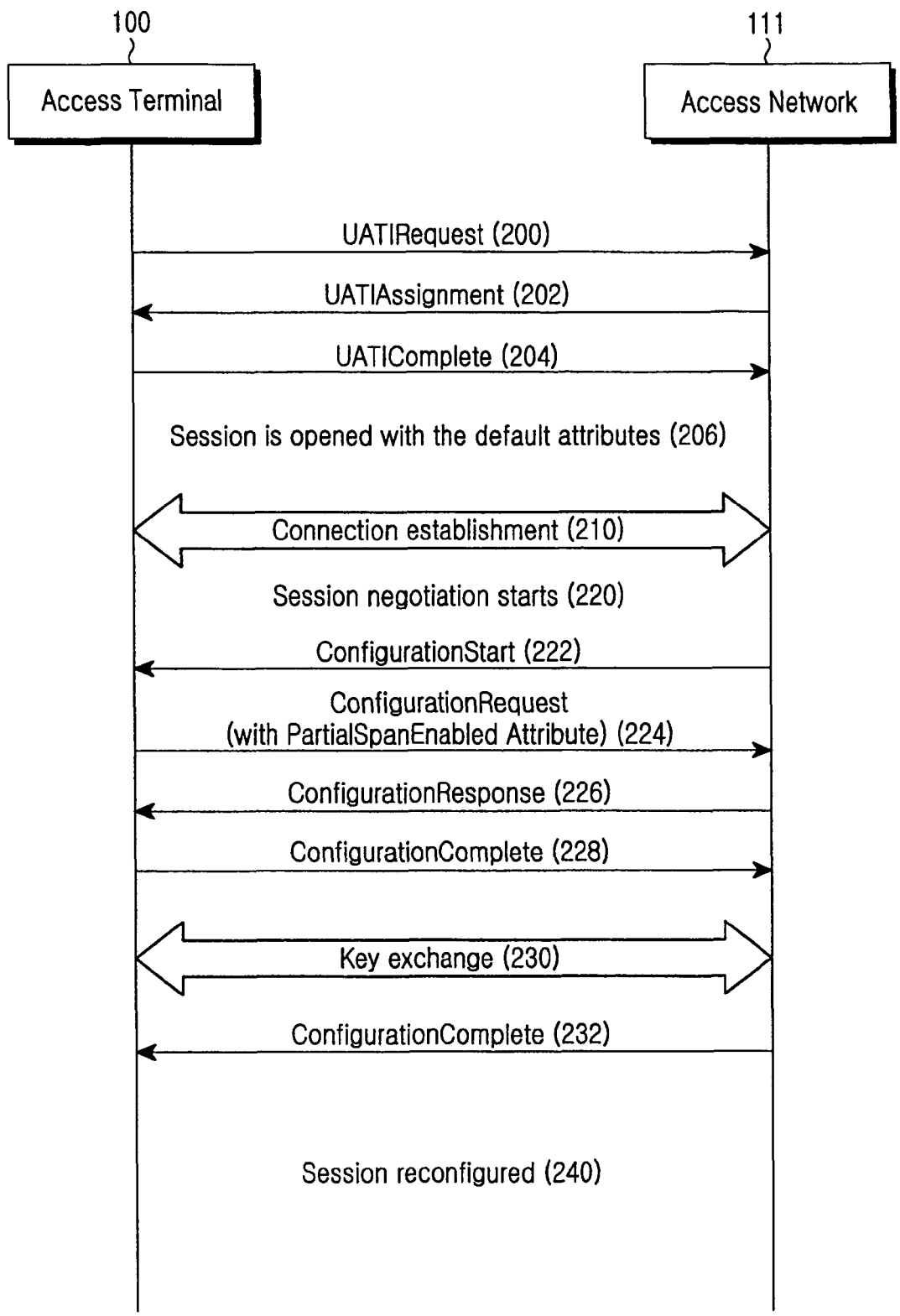
FIG. 2 is a signaling diagram illustrating a process of exchanging configuration attributes when a session is initially established according to an exemplary embodiment of the present invention.

FIG. 2 is a signaling diagram illustrating a process of exchanging configuration attributes when a session is initially established according to an exemplary embodiment of the present invention. With reference to FIG. 2, a detailed description will now be made of a process of exchanging configuration attributes when a session is initially established according to an exemplary embodiment of the present invention.

Before session establishment, an AT 100 and an AN 111 establishes a Unicast Access Terminal Identifier (UATI). That is, in step 200, the AT 100 transmits a UATI Request signal to the AN 111. In response, the AN 111 generates a UATI and transmits the UATI to the AT 100 in step 202. In step 204, the AT 100 informs the AN 111 of receipt of the UATI, completing a UATI setup process. If the access setup is completed through completion of the UATI setup, a process of determining session configuration attributes starts. The process of determining session configuration attributes is denoted by reference numeral 206. A description will now be made of the process of determining the session configuration attributes.

The configuration attribute decision process is divided into one part in which configuration attribute request values of the AT 100 are processed by the AN 111 and another part in which configuration attribute request values of the AN 111 are processed by the AT 100. A process of processing request values by the AN 111 follows the configuration attribute request of the AT 100. That is, connection between the AT 100 and the AN 111 is established in step 210, and a session negotiation process is performed in step 220.

In step 222, the AN 111 generates a ConfigurationStart message for session negotiation and transmits the ConfigurationStart message to the AT 100. Then, in step 224, the AT 100 generates a ConfigurationRequest message comprising a PartialSpanEnabled configuration attribute or a MinSpan configuration attribute indicating its own partial transmission information, and transmits the ConfigurationRequest message to the AN 111. In response, the AN 111 transmits a ConfigurationResponse message to the AT 100 in step 226, processing the configuration attributes. In response thereto, the AT 100 generates in step 228 a ConfigurationComplete message and transmits the ConfigurationComplete message to the AN 111. Generally, for the PartialSpanEnabled configuration attribute or the MinSpan configuration attribute indicating the partial transmission information, the AN 111 does not set the configuration attribute, but uses the value requested by the AT 100.

After completion of the negotiation on the session attributes, the AT 100 and the AN 111 re-initialize the protocols that were initialized with the default attributes for session establishment, using newly configured attributes, thereby applying the new configuration values. That is, a key value is exchanged between the AN 111 and the AT 100 in step 230, and the AN 111 generates a ConfigurationComplete message according to the key exchange result and transmits the ConfigurationComplete message to the AT 100 in step 232. Through this process, session reconfiguration between the AN 111 and the AT 100 is completed in step 240.

Alternatively, the partial transmission information can be transmitted through a message transmitted to an AT by an AN without using the configuration attributes. Even though the information is not exchanged, the partial transmission can be performed in a method predefined according to an exemplary implementation.

2. Operation of AT

Figure 3:
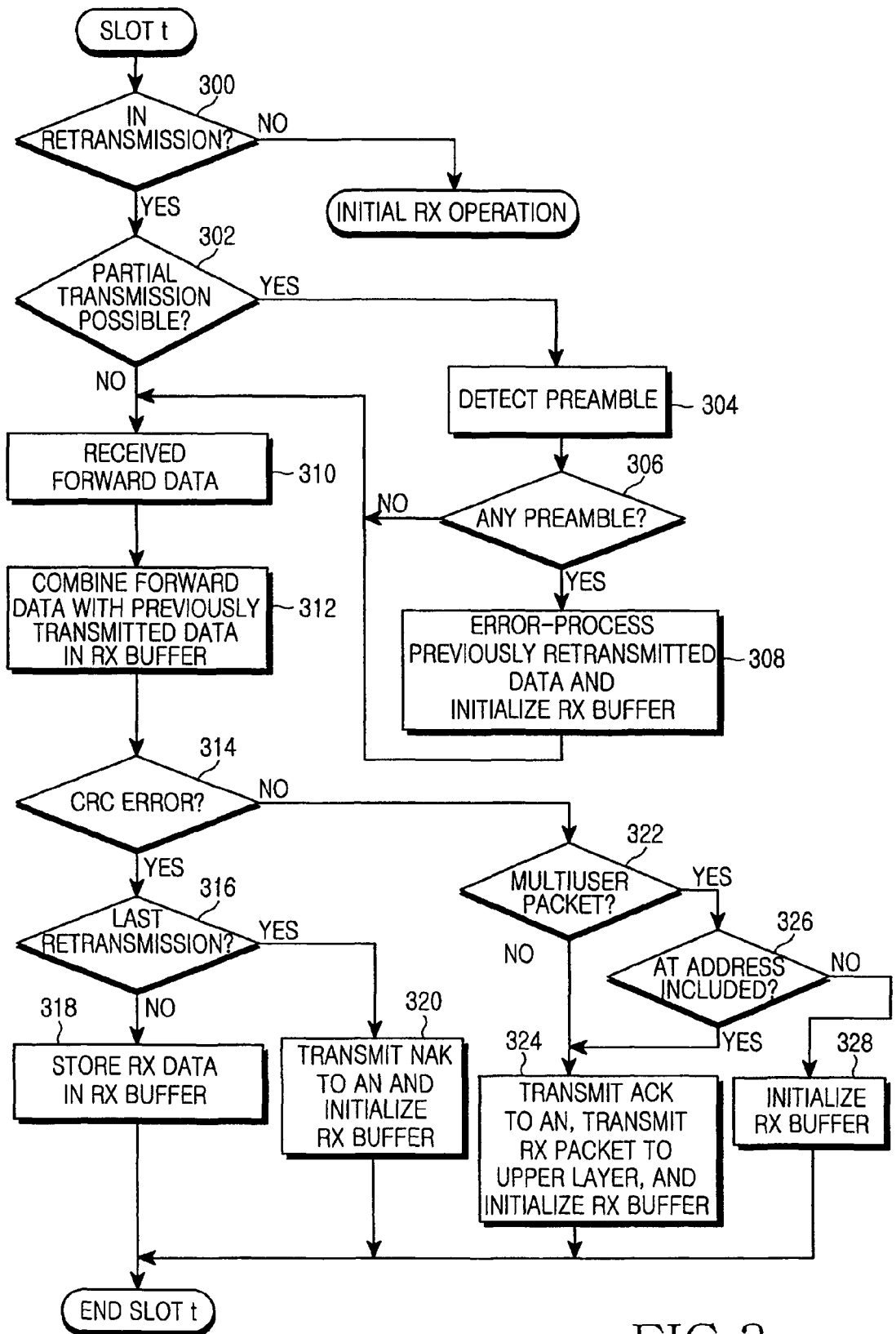
FIG. 3 is a flowchart illustrating a process in which an access terminal (AT) receives a forward physical packet after receiving partial transmission information according to an exemplary embodiment of the present invention.

FIG. 3 is a flowchart illustrating a process in which an AT receives a forward physical packet after receiving partial transmission information according to an exemplary embodiment of the present invention. With reference to FIG. 3, a detailed description will now be made of a process in which an AT receives a forward physical packet after receiving partial transmission information according to an exemplary embodiment of the present invention.

Because an exemplary embodiment of the present invention proposes a method of transmitting a new packet in the course of transmitting a physical packet according to a particular transmission format, description of an operation of the initial transmission will be omitted for clarity and conciseness.

If it is determined in step 300 that no packet is received, in other words, an AT 100 has an empty reception buffer and is waiting for initial transmission, the AT 100 performs the conventional initial reception operation. However, if it is determined in step 300 that a packet exists stored in the reception buffer and the AT 100 is waiting for the next subpacket of the packet, the AT 100 proceeds to step 302. In step 302, the AT 100 determines whether the partial transmission is possible in the current slot, using partial transmission information or a predefined transmission method. If it is determined in step 302 that the partial transmission is possible in the current slot, the AT 100 proceeds to step 304. However, if the partial transmission is not possible in the current slot, the AT 100 proceeds to step 310. The proceeding to step 304 will first be described herein below.

When the partial transmission is possible, an AN 111 can start transmission of a new packet even in the course of transmitting a particular transmission format. In this case, the AN 111 informs the AT 100 of the start of transmission of the new packet by transmitting a preamble distinguished according to a data rate of the packet and a receiving candidate before transmission of a first subpacket of the new packet. Because the preamble transmission method is used in the process of starting transmission of a new packet in the conventional technologies, a detailed description thereof will be omitted herein for clarity and conciseness.

In step 304, the AT 100 detects a preamble in a preamble transmission period, and determines in step 306 whether the preamble is detected for the period. That is, in step 306, the AT 100 determines whether there is a transmitted preamble of a new single user packet or multiuser packet compatible with a DRC transmitted by the AT 100. If it is determined in step 306 that there is a new transmitted preamble, the AT 100 proceeds to step 308. Otherwise, the AT 100 proceeds to step 310. When the new transmitted preamble exists, because a subpacket of the previously retransmitted packet is no longer transmitted, the AT 100 proceeds to step 308 where it initializes its reception buffer by deleting from the buffer the previous packet that is received but failed in decoding. Thereafter, the AT 100 receives forward data in step 310, and combines the received forward data with the previously transmitted data stored in the reception buffer in step 312. When the AT 100 proceeds from step 308 to step 310, the combining is not performed because the reception buffer empties. In this case, therefore, step 312 is not performed.

Thereafter, in step 314, the AT 100 determines whether a cyclic redundancy check (CRC) error occurs. If a CRC error occurs, the AT 100 proceeds to step 316. Otherwise, the AT 100 proceeds to step 322. The proceeding to step 316 will first be described. In step 316, the AT 100 determines whether the currently transmitted data is the last data. If it is determined in step 316 that the currently transmitted data is the last data, the AT 100 proceeds to step 320 where it transmits a negative-ACK (NAK) to the AN 111, and then ends the slot t. However, if it is determined in step 316 that the currently transmitted packet is not the last packet, the AT 100 proceeds to step 318 where it stores the received data in the reception buffer, and then ends the slot t.

However, if no CRC error occurs, the AT 100 determines in step 322 whether the received data is a multiuser packet. If it is determined in step 322 that the received data is a multiuser packet, the AT 100 proceeds to step 326. However, if the received data is a single user packet, the AT 100 proceeds to step 324. In step 326, the AT 100 determines if its own address is included in the multiuser packet. If its own address is included in the multiuser packet, the AT 100 proceeds to step 324. Otherwise, the AT 100 proceeds to step 328 where it initializes the reception buffer. If the AT 100 proceeds to step 324 from step 322 or step 326, the AT 100 transmits ACK information to the AN 111, transmits the received packet to an upper layer, and then initializes the reception buffer.

Figure 4:
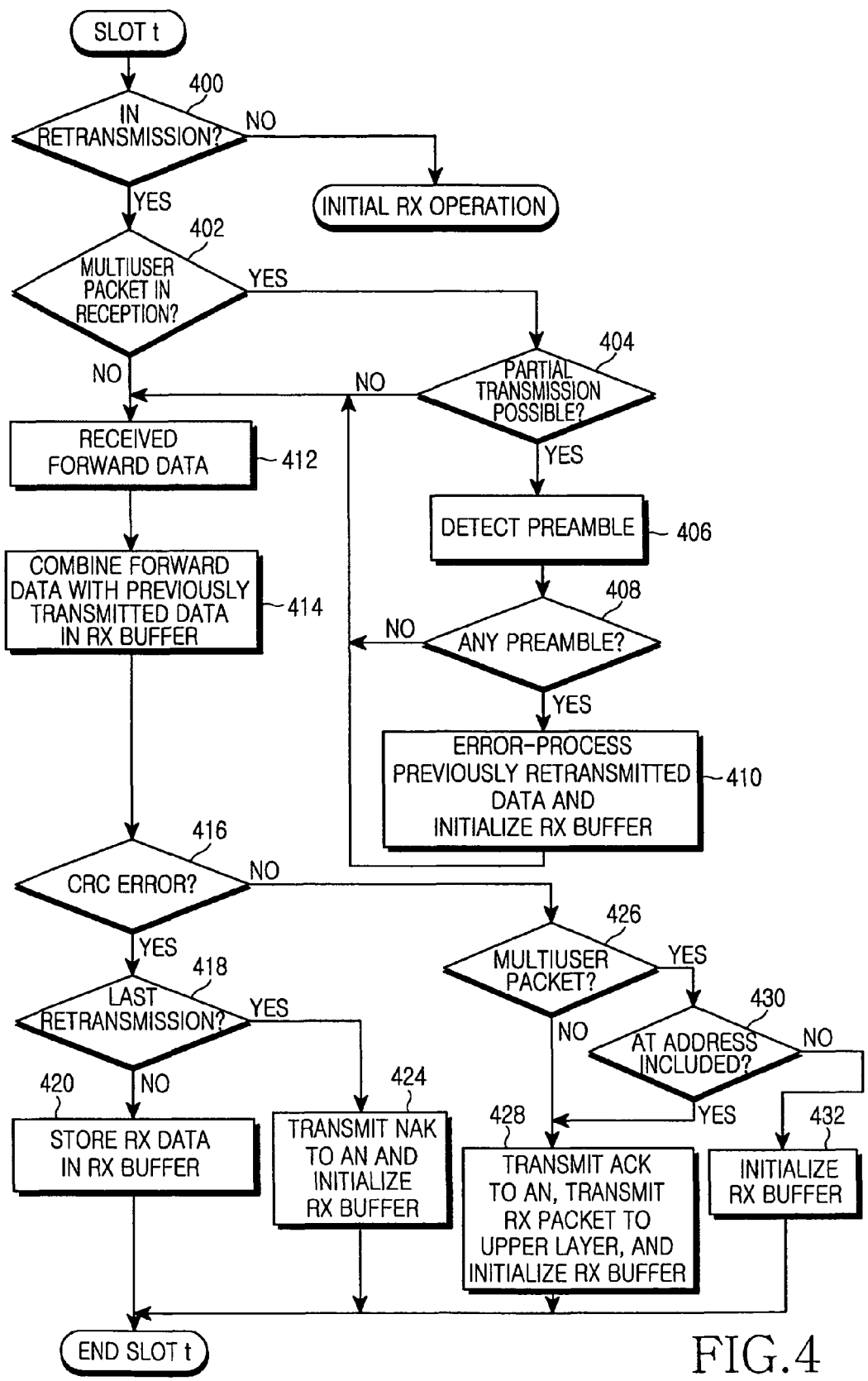
FIG. 4 is a flowchart illustrating a process of controlling an AT when partial transmission is applied not to a single user packet but only to a multiuser packet according to an exemplary embodiment of the present invention.

FIG. 4 is a flowchart illustrating a process of controlling an AT when partial transmission is applied not to a single user packet but only to a multiuser packet according to an exemplary embodiment of the present invention. With reference to FIG. 4, a description will now be made of a process of controlling an AT when partial transmission is applied not to a single user packet but only to a multiuser packet according to an exemplary embodiment of the present invention.

If it is determined in step 400 that no packet is received, in other words, an AT 100 has an empty reception buffer and is waiting for initial transmission, the AT 100 performs the conventional initial reception operation. However, if it is determined in step 400 that a packet exists stored in the reception buffer and the AT 100 is waiting for the next subpacket of the packet, the AT 100 determines in step 402 whether the received packet is a multiuser packet. If the received packet is a multiuser packet, the AT 100 determines in step 404 whether the partial transmission is possible in the current slot, using partial transmission information or a predefined transmission method. If the partial transmission is possible in the current slot, an AN 111 can start transmission of a new single user packet or multiuser packet even in the course of transmitting a particular multiuser packet. The AN 111 starts the transmission of the new packet by transmitting a preamble distinguished according to a data rate of the packet and a receiving candidate before transmission of a first subpacket of the new packet. Because the preamble transmission method is used in the process of starting transmission of a new packet in the conventional technologies, a detailed description thereof will be omitted for clarity and conciseness.

If the partial transmission is possible, the AT 100 determines in step 406 whether a preamble of a new single user packet or multiuser packet compatible with a DRC transmitted by the AT 100 has been transmitted. In step 408, the AT 100 determines whether a new preamble has been transmitted. If a new preamble has been transmitted, because a subpacket of the previously retransmitted packet is no longer transmitted, the AT 100 proceeds to step 410 where it initializes its reception buffer by deleting from the buffer the previous packet that is received but failed in decoding. After detecting a new preamble compatible with its own DRC, the AT 100 receives forward data in step 412, and combines the received forward data with the previously transmitted data stored in the reception buffer in step 414. When the AT 100 proceeds from step 410 to step 412, the combining is not performed because the reception buffer is empty. In this case, therefore, step 414 is not performed.

Thereafter, in step 416, the AT 100 determines whether a CRC error occurs. If a CRC error occurs, the AT 100 proceeds to step 418. Otherwise, the AT 100 proceeds to step 426. The proceeding to step 418 will first be described. In step 418, the AT 100 determines whether the currently transmitted data is the last data. If it is determined in step 418 that the currently transmitted data is the last data, the AT 100 proceeds to step 424 where it transmits a NAK to the AN 111, and then ends the slot t. However, if it is determined in step 418 that the currently transmitted packet is not the last packet, the AT 100 proceeds to step 420 where it stores the received data in the reception buffer, and then ends the slot t.

However, if no CRC error occurs, the AT 100 determines in step 426 whether the received data is a multiuser packet. If it is determined in step 426 that the received data is a multiuser packet, the AT 100 proceeds to step 430. However, if the received data is a single user packet, the AT 100 proceeds to step 428. In step 430, the AT 100 determines if its own address is included in the multiuser packet. If its own address is included in the multiuser packet, the AT 100 proceeds to step 428. Otherwise, the AT 100 proceeds to step 432 where it initializes the reception buffer. If the AT 100 proceeds to step 428 from step 426 or step 430, the AT 100 transmits ACK information to the AN 111, transmits the received packet to an upper layer, and then initializes the reception buffer.

3. Operation of AN

A description will now be made of the overall operation of an AN according to an exemplary embodiment of the present invention.

When a value of partial transmission information indicates that the partial transmission is not possible, if an AT fails to correctly receive a physical layer packet within the maximum number of transmissions or the maximum number of retransmissions for a transmission format corresponding to a DRC reported by the AT, an AN must not start transmission of a new packet to the corresponding AT for a time corresponding to the maximum number of retransmissions for the transmission format. In contrast, when a value of partial transmission information indicates that the partial transmission is possible, even though an AT fails to correctly receive a physical layer packet within the maximum number of transmissions or the maximum number of retransmissions for a transmission format corresponding to a DRC reported by the AT, an AN can start transmission of a new packet to the corresponding AT within the maximum number of retransmissions for the transmission format. When the partial transmission is possible in this way, the AN informs the AT of the start of transmission of the new packet by transmitting a preamble distinguished according to a data rate of the packet and a receiving candidate before transmission of a first subpacket of the new packet.

When the partial transmission is applied only to the multiuser packet, if an AT fails to correctly receive a physical layer packet within the maximum number of transmissions or the maximum number of retransmissions for a corresponding single user packet, an AN must not start transmission of a new packet to the corresponding AT for a time corresponding to the maximum number of retransmissions for the transmission format in the course of transmitting the single user packet.

For ATs whose partial transmission information indicates that the partial transmission is not possible among the ATs that transmitted DRCs compatible with a multiuser packet transmitted by an AN, if a corresponding AT fails to correctly receive a physical layer packet within the maximum number of transmissions or the maximum number of retransmissions for the multiuser packet, the AN must not start transmission of a new packet to the corresponding AT for a time corresponding to the maximum number of retransmissions for the transmission format. In contrast, for ATs whose partial transmission information indicates that the partial transmission is possible among the ATs that transmitted DRCs compatible with a multiuser packet transmitted by an AN, if a corresponding AT fails to correctly receive a physical layer packet within the maximum number of transmissions or the maximum number of retransmissions for the multiuser packet, the AN can start transmission of a new packet to the corresponding AT within the maximum number of retransmissions for the transmission format.

Figure 5:
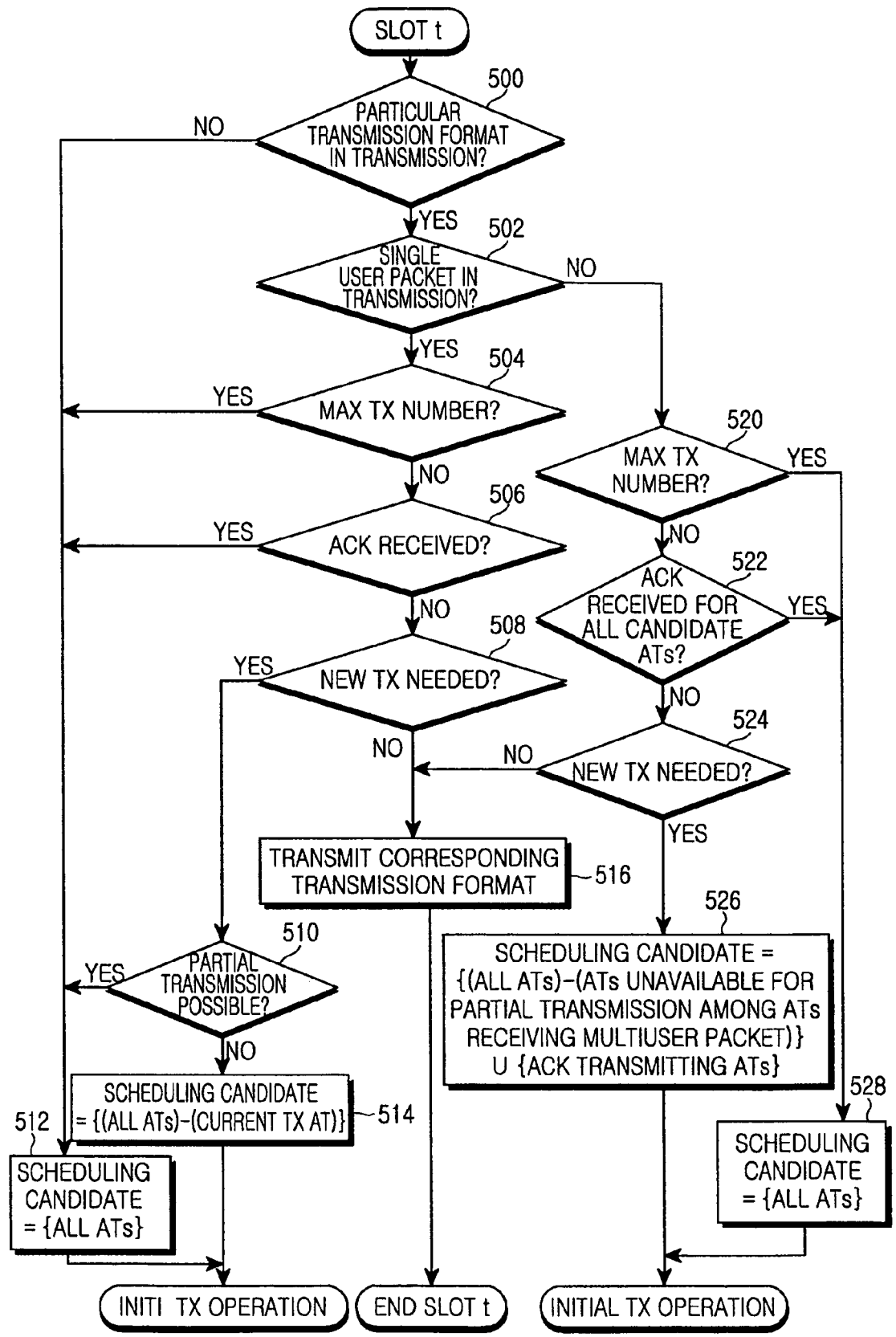
FIG. 5 is a flowchart illustrating a partial transmission operation of an AN according to an exemplary embodiment of the present invention.

FIG. 5 is a flowchart illustrating a partial transmission operation of an AN according to an exemplary embodiment of the present invention. With reference to FIG. 5, a detailed description will now be made of a partial transmission operation of an AN according to an exemplary embodiment of the present invention.

Because an exemplary embodiment of the present invention proposes a method for starting transmission of a new packet in the course of transmitting a packet according to a particular transmission format, description of an operation of the initial transmission will be omitted for clarity and conciseness.

In step 500, an AN 111 determines whether it is presently transmitting a particular transmission format. If it is not transmitting the particular transmission format, the AN 111 proceeds to step 512 where it performs an initial transmission operation, regarding all of its ATs as scheduling candidates. Otherwise, if it is determined in step 500 that the AN 111 is presently transmitting a particular transmission format, the AN 111 determines in step 502 whether the presently transmitted transmission format is a single user format or a multiuser format. If the current transmission format is a single user format, the AN 111 determines in step 504 whether it has reached the maximum number of transmissions for the presently transmitted single user format. If it has reached the maximum number of transmissions, the AN 111 proceeds to step 512 where it performs an initial transmission operation, regarding all of its ATs as scheduling candidates.

Otherwise, if it is determined in step 504 that it has not reached the maximum number of transmissions, the AN 111 determines in step 506 whether an ACK has been received from an AT that is presently receiving the single user format. If an ACK has been received, the AN 111 proceeds to step 512. However, if no ACK has been received, the AN 111 ends the current transmission and proceeds to step 508 where it determines whether a need exists for new transmission. If no need exists for new transmission, the AN 111 proceeds to step 516 where it continues to transmit the next subpacket of the current transmission format. Otherwise, if a need exists for new transmission, the AN 111 determines in step 510 whether an AT that is presently receiving the single user format supports partial transmission in the current slot. If the AT supports the partial transmission, the AN 111 proceeds to step 512 where it performs an initial transmission operation, regarding all of its ATs comprising the corresponding AT as scheduling candidates.

However, if it is determined in step 510 that the AT that is presently receiving the single user format does not support partial transmission in the current slot, the AN 111 proceeds to step 514 where it performs an initial transmission operation, regarding all of its ATs except for the corresponding AT as scheduling candidates.

However, if it is determined in step 502 that the presently transmitted transmission format is a multiuser format, the AN 111 determines in step 520 whether it has reached the maximum number of transmissions for the currently transmitted multiuser format. If it has reached the maximum number of transmissions, the AN 111 proceeds to step 528 where it performs an initial transmission operation, regarding all of its ATs as scheduling candidates. Otherwise, if it is determined in step 520 that it has not reached the maximum number of transmissions, the AN 111 determines in step 522 whether ACKs have been received from all of candidate ATs whose addresses are included in the multiuser format. If ACKs have been received from all of candidate ATs, the AN 111 proceeds to step 528 where it performs an initial transmission operation, regarding all of its ATs as scheduling candidates. However, if it is determined in step 522 that ACKs have not been received from all of the candidate ATs, the AN 111 determines in step 524 whether a need exists for new transmission after ending the current transmission. If no need exists for new transmission, the AN 111 proceeds to step 516 where it continues to transmit the next subpacket of the current transmission format. However, if it is determined in step 524 that a need exists for new transmission, the AN 111 proceed to step 526 where it performs an initial transmission operation, regarding as scheduling candidates the ATs that transmitted the ACKs up to now and all of its ATs except for ATs unavailable for the partial transmission in the current slot among the ATs that are presently receiving the multiuser format.

In the operation described with reference to FIG. 5, the partial transmission operation proposed in an exemplary embodiment of the present invention is applied to both the single user format and the multiuser format. When the partial transmission operation is not applied to the single user format, if a need exists for new transmission in step 508, the AN 111 directly proceeds to step 514 passing the process of step 510. In addition, when the partial transmission operation is not applied to the multiuser format, the AN 111 performs in step 526 an initial transmission operation, regarding as scheduling candidates the ATs that transmitted the ACKs and all of its ATs except for the ATs that are presently receiving the multiuser format.

A description will now be made of structures of an AN and an AT according to an exemplary embodiment of the present invention.

Figure 6:
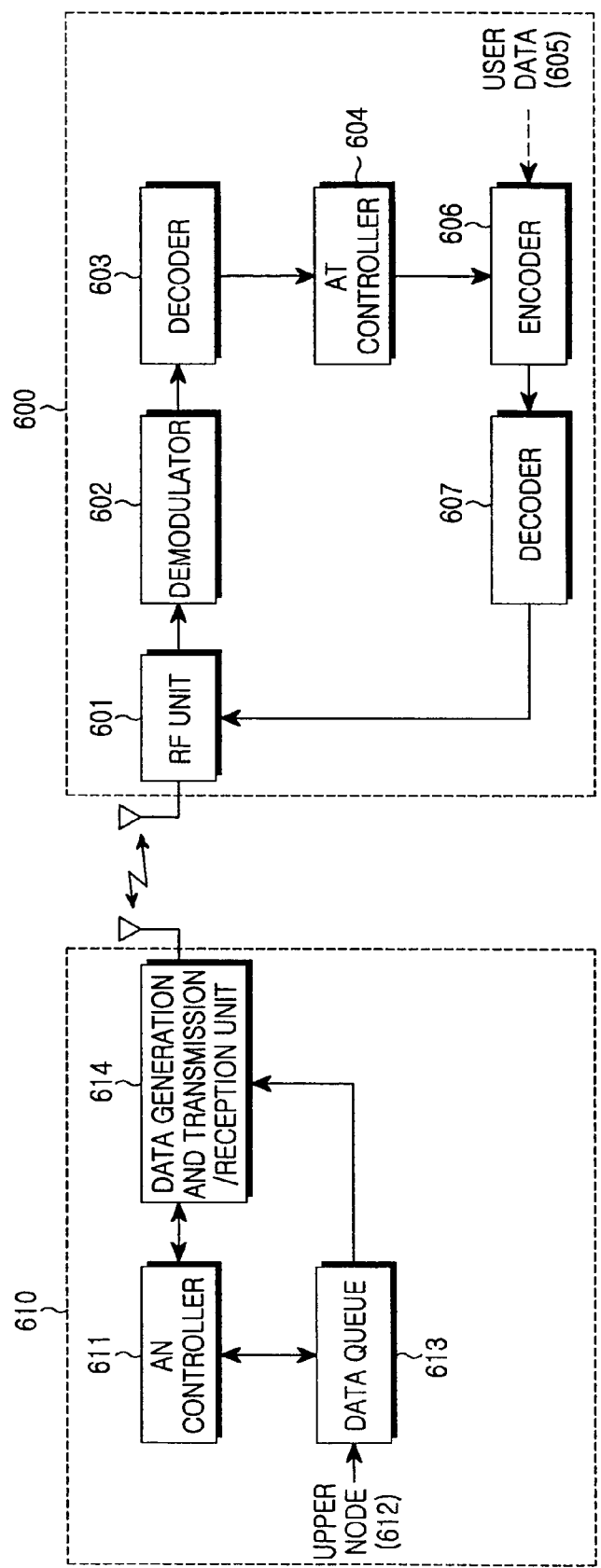
FIG. 6 is a block diagram illustrating structures of an AN and an AT according to an exemplary embodiment of the present invention.

FIG. 6 is a block diagram illustrating structures of an AN and an AT according to an exemplary embodiment of the present invention. With reference to FIG. 6, a detailed description will now be made of structures of an AN and an AT according to an exemplary embodiment of the present invention.

A structure and operation of an AN 610 will first be described herein below. A structure for performing session establishment and storing information thereon is not illustrated in FIG. 6, for clarity and conciseness. An AN controller 611 comprises a scheduling function to control the scheduling operation described in connection with FIG. 5. A data queue 613 stores user data received from an upper node 612 separately for individual users. For example, the upper node 612 corresponds to the ANC 120 of FIG. 1. The AN controller 611 detects the data stored in the data queue 613, and performs scheduling according to characteristics of the data before transmission. In other words, the AN controller 611 controls transmission of the data stored in the data queue 613. When transmitting a single user packet, the AN controller 611 outputs data stored in only one data queue to a data generation and transmission/reception unit 614. However, when transmitting a multiuser packet, the AN controller 611 outputs user data stored in a plurality of data queues to the data generation and transmission/reception unit 614. Then the data generation and transmission/reception unit 614 generates a transmission burst under the control of the AN controller 611, and transmits the transmission burst through a corresponding radio band.

Although not illustrated in FIG. 6, the AN 610 receives information necessary for session negotiation through the data generation and transmission/reception unit 614. The AN 610 demodulates and decodes the received data, and provides the decoded data to the AN controller 611. In this manner, the AN controller 611 can retrieve the information described with reference to FIG. 2 while performing session negotiation, generate response data from the retrieved information, and provide the response data to an AT 600 through the data generation and transmission/reception unit 614. In addition, the AN 610 stores session information for the corresponding AT in a separate memory (not shown in FIG. 6), and based on the session information, determines whether the partial transmission is possible in the process of FIG. 5.

Next, a structure and operation of the AT 600 will be described. The AT 600 corresponds to the AT 100 of FIG. 1. In the AT 600, a radio frequency (RF) unit 601 frequency-down-converts a RF signal received from an antenna into a baseband signal, and outputs the baseband signal to a demodulator 602. The demodulator 602 demodulates the baseband signal modulated during its transmission, and outputs the demodulated data to a decoder 603. The decoder 603 decodes the demodulated data encoded during its transmission, and outputs the decoded data to an AT controller 604 together with a CRC error check result. The AT controller 604 controls the operations of FIGS. 3 and 4. Description of other control operations performed by the AT controller 604 will be omitted for clarity and conciseness.

In addition, the AT controller 604 generates a control signal to be transmitted in the reverse direction and the data necessary for session negotiation shown in FIG. 2, and outputs the generated control signal and session negotiation data to an encoder 606. The encoder 606 encodes the user data, the control signal, and the session negotiation data, and outputs the encoded data to a modulator 607. The modulator 607 performs modulation with a modulation method according to the characteristics of the data, and outputs the modulated data to a RF unit 601. The RF unit 601 frequency-up-converts the data received from the modulator 607 into an RF signal, and reverse-transmits the RF signal to the AN 610 via an antenna.

As can be understood from the foregoing description, even though an AT does not succeed in transmission within the maximum number of transmissions for a transmission format corresponding to a DRC indicated by the AT, an AN can start transmission of a new data packet, thereby solving the scheduling restrictions of the AN. In this manner, exemplary embodiments of the present invention contribute to an increase in throughput of the mobile communication system.

While exemplary embodiments of the invention have been shown and described with reference to a certain exemplary implementations thereof, it will be understood by those skilled in the art that various changes in form and details may be made therein without departing from the spirit and scope of the invention as defined by the appended claims.

What is claimed is:

1. A method comprising:
receiving, by an access network (AN), uplink signaling information representing forward data rate information, and repeat transmission information from each AT, the repeat transmission information including a number of repeat transmission slots to be used for repeat transmission; and
transmitting packet data to each AT according to the forward data rate information and a partial transmission information, the partial transmission information including a number of transmit slots, which is less than the number of repeat transmission slots, to be used in transmitting the packet data,
wherein the partial transmission information is indicative of a number of slots after starting transmission of the packet data at which partial transmission of new packet data is possible.

2. The method of claim 1, wherein the partial transmission information is predetermined during session negotiation with the AT.

3. The method of claim 1, wherein the transmitted packet data comprises single user packet data.

4. The method of claim 3, wherein the AN repeatedly transmits the packet data until an acknowledgement signal (ACK) for the transmitted packet data is received from the AT, or repeatedly transmits the packet data according to the partial transmission information.

5. The method of claim 1, wherein the transmitted packet data comprises multiuser packet data.

6. The method of claim 5, wherein the AN repeatedly transmits the packet data until ACKs for the transmitted packet data are received from all of ATs included in the packet, or repeatedly transmits the packet data according to the partial transmission information.

7. The method of claim 1, wherein when single user packets are transmitted to all of the ATs and partial transmission is possible for all of the ATs, the AN schedules the new packet data according to the partial transmission information, regarding all of the ATs as scheduling candidates.

8. The method of claim 1, wherein when single user packets are transmitted to all of the ATs and partial transmission is not possible for all of the ATs, the AN schedules the new packet data according to the partial transmission information, regarding as scheduling candidates all of the ATs in the AN except for an AT that is presently transmitting the packet data.

9. The method of claim 1, wherein when the packet data comprises a multiuser packet data and repeated transmissions of the multiuser packet data are completed, the AN schedules the new packet data according to the partial transmission information, regarding all of the ATs as scheduling candidate.

10. The method of claim 1, wherein when the packet data comprises a multiuser packet data and a need exists for scheduling of new packet data before the AN receives ACKs from all of the ATs receiving the multiuser packet, the AN performs scheduling for the new packet data according to the partial transmission information, regarding as scheduling candidates the ATs transmitting ACKs and all of the ATs except for an AT that must make repeated transmission to the AT that is receiving the multiuser packet.

11. The method of claim 1, wherein the transmitting step further comprises, transmitting the packet data to each AT according to the forward data rate information and a partial transmission information when the number of repeat transmission slots is greater than or equal to two.

12. A method comprising:
transmitting, by the AT, uplink signaling information representing forward data rate information and repeat transmission information, the repeat transmission information including a number of repeat transmission slots to be used for repeat transmission; and
receiving, by the AT, packet data according to the forward data rate information and a partial transmission information, the partial transmission information including a number of transmit slots, which is less than the number of repeat transmission slots, to be used in transmitting the packet data,
wherein the partial transmission information is indicative of a number of slots after starting transmission of the packet data at which partial transmission of new packet data is possible.

13. The method of claim 12, wherein the partial transmission information is predetermined during session negotiation with the AN.

14. The method of claim 12, wherein the packet data comprises single user packet data.

15. The method of claim 12, wherein the packet data comprises multiuser packet data.

16. The method of claim 15, further comprising the step of, upon receiving the packet data, checking whether an error occurs in the received packet data, and transmitting an acknowledgement signal (ACK) if no error occurs.

17. The method of claim 16, further comprising the step of waiting for new packet data after transmission of the ACK.

18. The method of claim 12, wherein the receiving step further comprises, receiving the packet data according to the forward data rate information and a partial transmission information when the number of repeat transmission slots is greater than or equal to two.

19. An access network (AN) apparatus for receiving uplink signaling information representing forward data rate information, and transmitting packet data to each AT according to the forward data rate information, the apparatus comprising:
a data queue for storing data to be transmitted to each AT;
a data generation and transmission/reception unit for generating packet data using data received from the data queue, and for transmitting the packet data; and
an AN controller for scheduling the transmission/reception unit for receiving uplink signaling information representing the forward data rate information, and repeat transmission information from each AT, the repeat transmission information including a number of repeat transmission slots to be used for repeat transmission, for transmitting packet data to each AT according to the forward data rate information and a partial transmission information, the partial transmission information including a number of transmit slots, which is less than the number of repeat transmission slots, to be used in transmitting the packet data, wherein the partial transmission information is indicative of a number of slots after starting transmission of the packet data at which partial transmission of new packet data is possible.

20. The AN apparatus of claim 19, wherein the partial transmission information is predetermined during session negotiation with the AT.

21. The AN apparatus of claim 19, wherein the packet data comprises single user packet data.

22. The AN apparatus of claim 19, wherein the packet data comprises multiuser packet data.

23. The AN apparatus of claim 22, wherein the AN repeatedly transmits the packet data until acknowledgement signals (ACKs) for the transmitted packet data are received from all of the ATs included in the packet, or repeatedly transmits the packet data according to the partial transmission information.

24. The AN apparatus of claim 19, wherein when single user packets are transmitted to all of the ATs and partial transmission is possible for all of the ATs, the AN schedules the new packet data according to the partial transmission information, regarding all of the ATs as scheduling candidates.

25. The AN apparatus of claim 19, wherein when single user packets are transmitted to all of the ATs and partial transmission is not possible for all of the ATs, the AN schedules the new packet data according to the partial transmission information, regarding as scheduling candidates all of the ATs except for an AT that is presently transmitting the packet data.

26. The AN apparatus of claim 19, wherein when the packet data comprises a multiuser packet data and repeated transmissions of the multiuser packet data are completed, the AN schedules the new packet data, regarding all of the ATs as scheduling candidates.

27. The AN apparatus of claim 19, wherein when the packet data comprises a multiuser packet data and a need exists for scheduling of new packet data before the AN receives ACKs from all of the ATs receiving the multiuser packet, the AN performs scheduling for the new packet data according to the partial transmission information, regarding as scheduling candidates the ATs transmitting ACKs and all of the ATs except for an AT that must make repeated transmission to the AT that is receiving the multiuser packet.

28. The apparatus of claim 19, wherein the AN controller transmits the packet data to each AT according to the forward data rate information and a partial transmission information when the number of repeat transmission slots is greater than or equal to two.

29. An access terminal (AT) apparatus for transmitting uplink signaling information representing forward data rate information, and receiving packet data based on the forward data rate information, the apparatus comprising:
- a radio frequency (RF) unit for frequency-down-converting a received forward packet data;
- a demodulator for demodulating an output of the RF unit;
- a decoder for decoding a signal demodulated by the demodulator; and
- an AT controller for transmitting uplink signaling information representing the forward data rate information and repeat transmission information, the repeat transmission information including a number of repeat transmission slots to be used for repeat transmission, for receiving packet data according to the forward data rate information and a partial transmission information, the partial transmission information including a number of transmit slots, which is less than the number of repeat transmission slots, to be used in transmitting the packet data, wherein the partial transmission information is indicative of a number of slots after starting transmission of the packet data at which partial transmission of new packet data is possible.

30. The AT apparatus of claim 29, further comprising:
- an encoder for checking whether a reception error occurs in the received packet data, and encoding a signal comprising an error check result; and
- a modulator for modulating the encoded signal;
- wherein the RF unit frequency-up-converts the modulated signal before transmission.

31. The AT apparatus of claim 29, wherein the partial transmission information is predetermined during session negotiation with the AN.

32. The apparatus of claim 29, wherein the AN controller receives the packet data according to the forward data rate information and a partial transmission information when the number of repeat transmission slots is greater than or equal to two.

* * * * *